United States Patent
Han et al.

(10) Patent No.: US 10,726,996 B2
(45) Date of Patent: *Jul. 28, 2020

(54) MULTILAYER CERAMIC CAPACITOR AND METHOD OF MANUFACTURING THE SAME

(71) Applicant: SAMSUNG ELECTRO-MECHANICS CO., LTD., Suwon-Si, Gyeonggi-Do (KR)

(72) Inventors: Seung Hun Han, Suwon-si (KR); Dong Joon Oh, Suwon-si (KR); Sung Min Cho, Suwon-si (KR); Chang Hak Choi, Suwon-si (KR); Seung Mo Lim, Suwon-si (KR); Woong Do Jung, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/124,049

(22) Filed: Sep. 6, 2018

(65) Prior Publication Data

US 2019/0157006 A1 May 23, 2019

(30) Foreign Application Priority Data

Nov. 21, 2017 (KR) .................... 10-2017-0155624
Mar. 15, 2018 (KR) .................... 10-2018-0030021

(51) Int. Cl.
*H01G 4/248* (2006.01)
*H01G 4/232* (2006.01)
(Continued)

(52) U.S. Cl.
CPC ............. *H01G 4/248* (2013.01); *H01G 4/008* (2013.01); *H01G 4/012* (2013.01); *H01G 4/1227* (2013.01); *H01G 4/232* (2013.01); *H01G 4/2325* (2013.01); *H01G 4/30* (2013.01); *H01G 4/12* (2013.01)

(58) Field of Classification Search
CPC ........ H01G 4/248; H01G 4/008; H01G 4/012; H01G 4/1227; H01G 4/232; H01G 4/2325; H01G 4/30; H01G 4/12
See application file for complete search history.

(56) References Cited

U.S. PATENT DOCUMENTS

2005/0012200 A1* 1/2005 Sawada ................ H01G 4/2325
                                                                            257/698
2009/0273882 A1* 11/2009 Park ....................... H01G 4/008
                                                                            361/305

(Continued)

FOREIGN PATENT DOCUMENTS

KR  10-2016-0001026 A  1/2016
KR  10-2017-0000768 A  1/2017

*Primary Examiner* — Dion Ferguson
(74) *Attorney, Agent, or Firm* — Morgan, Lewis & Bockius LLP (57) ABSTRACT

A multilayer ceramic capacitor includes a body including a dielectric layer and internal electrodes with external electrodes disposed on one surface of the body, wherein the external electrodes include a first electrode layer disposed on one surface of the body, in contact with the internal electrodes, and including titanium nitride (TiN), and a second electrode layer disposed on the first electrode layer.

19 Claims, 6 Drawing Sheets

(51) Int. Cl.
  *H01G 4/12*    (2006.01)
  *H01G 4/008*   (2006.01)
  *H01G 4/012*   (2006.01)
  *H01G 4/30*    (2006.01)

(56) References Cited

U.S. PATENT DOCUMENTS

| | | | |
|---|---|---|---|
| 2010/0196592 A1* | 8/2010 | Kim | H01G 4/008 |
| | | | 427/79 |
| 2015/0380161 A1 | 12/2015 | Lim et al. | |
| 2016/0093444 A1* | 3/2016 | Itamura | H01G 4/248 |
| | | | 174/260 |
| 2016/0095223 A1* | 3/2016 | Yoshida | H01G 4/2325 |
| | | | 174/260 |
| 2016/0172110 A1* | 6/2016 | Otani | H01G 4/30 |
| | | | 361/301.4 |
| 2016/0379758 A1 | 12/2016 | Otani | |
| 2017/0301468 A1* | 10/2017 | Kim | H01G 4/2325 |
| 2018/0286589 A1* | 10/2018 | Cho | H01G 4/2325 |
| 2018/0286594 A1* | 10/2018 | Kim | H01G 4/30 |
| 2019/0103225 A1* | 4/2019 | Han | H01G 4/2325 |

* cited by examiner

MULTILAYER CERAMIC CAPACITOR AND METHOD OF MANUFACTURING THE SAME

CROSS-REFERENCE TO RELATED APPLICATION

This application claims the benefit of priority to Korean Patent Application Nos. 10-2017-0155624 filed on Nov. 21, 2017, and 10-2018-0030021 filed on Mar. 15, 2018 in the Korean Intellectual Property Office, the disclosure of which is incorporated herein by reference in its entirety.

TECHNICAL FIELD

The present disclosure relates to a multilayer ceramic capacitor and a method of manufacturing the same.

BACKGROUND

As multilayer ceramic capacitors (MLCCs) have been reduced in size and increased in capacity, the importance of increasing an effective volume ratio of MLCCs (ratio of a volume contributing to capacity to total volume) has grown.

Conventionally, in order to form external electrodes, a method of dipping a surface to which internal electrodes of a body are exposed into paste containing a conductive metal has commonly been used.

Here, however, a thickness of external electrodes of an MLCC formed by the dipping method is not uniform, and the external electrode is formed to be relatively thin at the corners of a body, while the external electrode is formed to be relatively thick in other portions thereof. As a result, it is difficult to secure a high effective volume ratio. In addition, when a plating layer is formed on the external electrodes to improve connectivity and mountability of the MLCC, a plating solution may penetrates into the inside of the body to reduce reliability of the MLCC.

SUMMARY

An aspect of the present disclosure may provide a multilayer ceramic capacitor (MLCC) in which a thin, dense primary electrode layer is formed in a body thereof to ensure sufficient moisture resistance reliability, even in the case that external electrodes are thin and enhance an effective volume ratio.

According to an aspect of the present disclosure, a multilayer ceramic capacitor may include: a body including a dielectric layer and internal electrodes with external electrodes disposed on one surface of the body, wherein the external electrodes include a first electrode layer disposed on one surface of the body, in contact with the internal electrodes, and including titanium. nitride (TiN); and a second electrode layer disposed on the first electrode layer.

According to another aspect of the present disclosure, a method of manufacturing a multilayer ceramic capacitor may include: preparing a body including dielectric layer and internal electrodes; forming a first electrode layer including titanium nitride (TiN) on the entire surface of the body using an atomic layer deposition (ALD) method; forming a second electrode layer on portions of the body where the first electrode layer is formed and on which first and second external electrodes are to be formed; and etching and removing an exposed portion of the first electrode layer from the body on which the second electrode layer is formed.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. In addition, a vertical direction refers to the abovementioned upward and downward directions, and horizontal direction refers to a direction perpendicular to the abovementioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Multilayer Ceramic Capacitor

Figure 1:
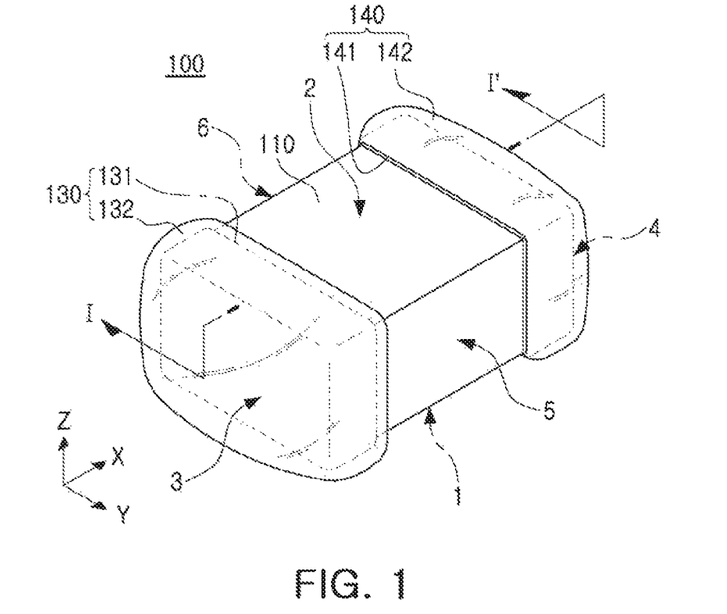
FIG. 1 is a perspective view schematically illustrating a multilayer ceramic capacitor (MLCC) according to an exemplary embodiment in the present disclosure.
Figure 2:
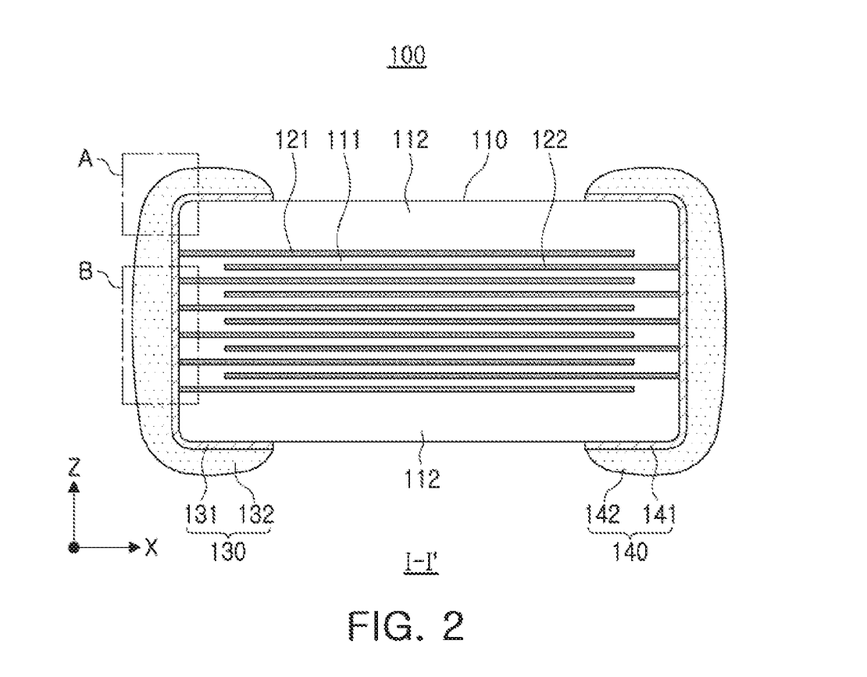
FIG. 2 is a cross-sectional view taken along line I-I' of FIG. 1.
Figure 3:
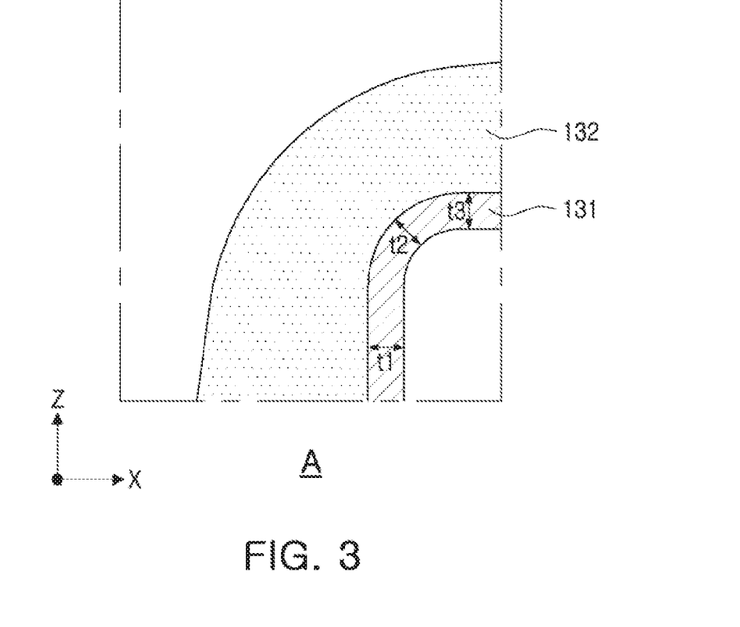
FIG. 3 is a schematic enlarged cross-sectional view of a portion 'A' of FIG. 2.
Figure 4:
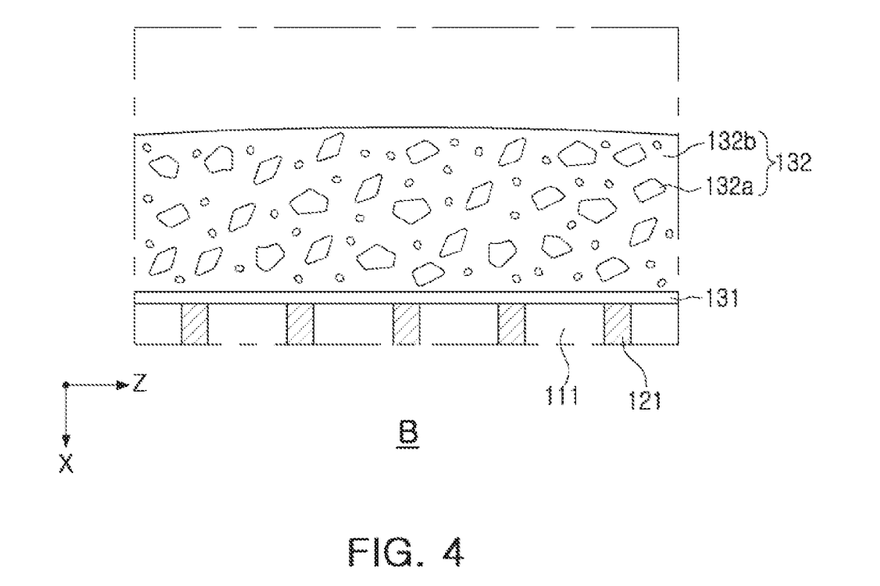
FIG. 4 is a schematic enlarged cross-sectional view of a portion 'B' of FIG. 2.

FIG. 1 is a perspective view schematically illustrating multilayer ceramic capacitor (MLCC) according to an exemplary embodiment in the present disclosure. FIG. 2 is a cross-sectional view taken along line I-I' of FIG. 1. FIG. 3 is a schematic enlarged cross-sectional view of a portion 'A' of FIG. 2. FIG. 4 is a schematic enlarged cross-sectional view of a portion 'B' of FIG. 2.

Hereinafter, a multilayer ceramic capacitor (MLCC) 100 according to an exemplary embodiment in the present disclosure will be described with reference to FIGS. 1 to 4.

Referring to FIG. 1, an MLCC 100 according to an exemplary embodiment in the present disclosure includes a body 110 and first and second external electrodes 130 and 140 disposed outside the body 110.

The body 110 may have first and second surfaces 1 and 2 opposing each other in the thickness direction (Z direction), third and fourth surfaces 3 and 4 connected to the first and second surfaces 1 and 2 and opposing each other in the width direction (Y direction), and fifth and sixth surfaces 5 and 6 connected to the first and second surfaces 1 and 2, connected to the third and fourth surfaces 3 and 4, and opposing each other 10 in the length direction (X direction).

Referring to FIG. 2, the body 110 includes a dielectric layer 111 and internal electrodes 121 and 122 disposed to be alternately exposed respectively to the third and fourth surfaces 3 and 4 with the dielectric layer 111 interposed therebetween.

The body 110 is formed by stacking a plurality of dielectric layers 111 in the thickness (Z) direction and then sintering the stacked dielectric layers 111. The shape and dimensions of the body 110 and the number of stacked layers of the dielectric layer 111 are not limited to those illustrated.

The plurality of dielectric layers 111 forming the body 110 are in a sintered state and adjacent dielectric layers 111 may be integrated such that boundaries therebetween may not be readily apparent without using a scanning electron microscope (SEM)

A raw material used to form the dielectric layer 111 is not limited as long as it may obtain sufficient capacitance. For example, the raw material may be barium titanate (BaTiO$_3$) powder. As a material used to form the dielectric layer 111, a variety of ceramic additives, organic solvents, plasticizers, binders, dispersants, and the like, may be added to the powder of the barium titanate (BaTiO$_3$), and the like, according to purposes of the present disclosure.

The internal electrodes 121 and 122 may include a first internal electrode 121 exposed to the third surface 3 and a second internal electrode 122 exposed to the fourth surface 4.

The first and second internal electrodes 121 and 122 are a pair of electrodes having opposing polarities and are electrically insulated from each other by the dielectric layer 111 disposed therebetween.

The first and second internal electrodes 121 and 122 are alternately exposed to the third and fourth surfaces 3 and 4 in the length direction (X direction) of the body 110 so as to be connected to the first and second external electrodes 130 and 140 disposed on an outer side of the body 110, respectively.

Thicknesses of the first and second internal electrodes 121 and 122 may be determined depending on the application.

For example, widths of the first and second internal electrodes 121 and 122 may be formed to satisfy the range of 0.2 to 1.0 pm in consideration of a size of the body 110, but the present disclosure is not limited thereto.

The first and second internal electrodes 121 and 122 may include a conductive metal such as nickel (Ni), copper (Cu), palladium (Pd), silver (Ag), lead (Pb), or platinum (Pt) alone or alloys thereof.

The body 110 may include a cover layer 112 formed by stacking dielectric layers without an internal electrode on the upper and lower surfaces of the body 110. The cover layer 112 may serve to maintain reliability of the MLCC against an external impact.

The external electrodes 130 and 140 include first electrode layers 131 and 141 disposed on corresponding surface of the body 110, in contact with the internal electrodes 121 and 122, and including TiN and second electrode layers 132 and 142 disposed on the corresponding first electrode layers 131 and 132, respectively.

The external electrodes 130 and 140 may include first and second external electrodes 130 and 140 connected to the first and second internal electrodes 121 and 122, respectively.

The first and second external electrodes 130 and 140 may include connecting portions respectively formed on the third and fourth surfaces 3 and 4 of the body 110, band portions extending from the connecting portions so as to be formed on portions of the first, second, fifth, and sixth surfaces 1, 2, 5, and 6 of the body, and corner portions where the connecting portions and the band portions are contiguous.

A structure of the first and, second external electrodes 130 and 140 of the MLCC according to one an exemplary embodiment in the present disclosure will be described in detail with reference to FIGS. 3 and 4. FIGS. 3 and 4 are enlarged views of the first external electrode 130 but descriptions thereof may also be applied to the second external electrode 140.

The first electrode layer 131 includes TiN (titanium nitride). It may also be formed of TiN only.

TiN is excellent in acid resistance and durability, having a low possibility of breakage during the process, and is excellent in adhesion with ceramics, metals, and the like. In addition, TiN has low moisture permeability, improving moisture resistance reliability.

The first electrode layer 131 may be formed using an atomic layer deposition (ALD) method.

The ALD method is a technique for depositing a thin film or a protective film on a surface of a substrate during a semiconductor process. Unlike the conventional deposition technique of chemically coating a thin film, the ALD technique is a technique for growing a thin film by stacking atomic layers, and thus, provides conformal coverage of the deposited material. In other words, a material deposited using ALD is deposited conformally over the substrate on which it is deposited to form a thin film of the deposited material. The ALD method is excellent in step coverage, facilitates adjustment of a thickness of a thin film, and form a uniform thin film. Moreover, the thickness of the thin film can be controlled at atomic level, i.e., at sub-nanometer level.

In addition, in case where the first electrode layer is formed by the ALD method using TN, connectivity between the internal electrodes and the external electrodes may be sufficiently secured even with a thickness of about 5 nm. Accordingly, a thickness of the external electrodes may be reduced, increasing an effective volume ratio.

The thickness of the first electrode layer 131 may be 10 to 500 nm.

If the thickness of the first electrode layer 131 is less than 10 nm, a sufficient moisture permeation preventing effect may not be obtained, and if the thickness exceeds 500 nm, the ESR may increase.

The following Table 1 shows the results of measuring changes in moisture resistance reliability according to the maximum thickness of the first electrode layer after forming a first electrode layer with TiN and forming a, second electrode layer with a resin-based electrode using the ALD method.

The moisture resistance reliability was tested by applying a voltage of 9.5 V for 20 hours under the conditions of 85° C., and 85%, 100 samples of each sample number were tested, and the number of samples which were not defective in reliability was indicated by

TABLE 1

| Sample No. | Thickness of thin film layer (nm) | Moisture resistance reliability (%) |
|---|---|---|
| 1* | 1 | 28 |
| 2* | 3 | 27 |
| 3* | 5 | 24 |
| 4* | 7 | 73 |
| 5 | 10 | 100 |
| 6 | 19 | 100 |
| 7 | 51 | 100 |
| 8 | 70 | 100 |
| 9 | 98 | 100 |
| 10 | 201 | 100 |
| 11 | 294 | 100 |
| 12 | 397 | 100 |
| 13 | 499 | 100 |

Referring to Table 1, it can be seen that the moisture resistance reliability is 100% when the thickness of the first electrode layer is 10 nm or greater.

Referring to FIG. 3, t2/t1 may be 0.9 or greater in which t1 is the thickness of the connecting portion of the first electrode layer and t2 is the thickness of the corner portion of the first electrode layer. Since the first electrode layer is formed using the ALD method, the thickness of the first electrode layer may be adjusted to be uniform as a whole so that t2/t1 is 0.9 or greater. Accordingly, the first electrode layer may be formed to have a sufficient thickness even in the corner portion, thereby blocking a moisture and plating solution penetration path.

Also, t3/t1 may be 0.9 to 1.1 in which t3 is the thickness of the band portion of the first electrode layer. That is, a thickness variation of the connecting portion and the band portion may be 10% or less.

Figure 5:
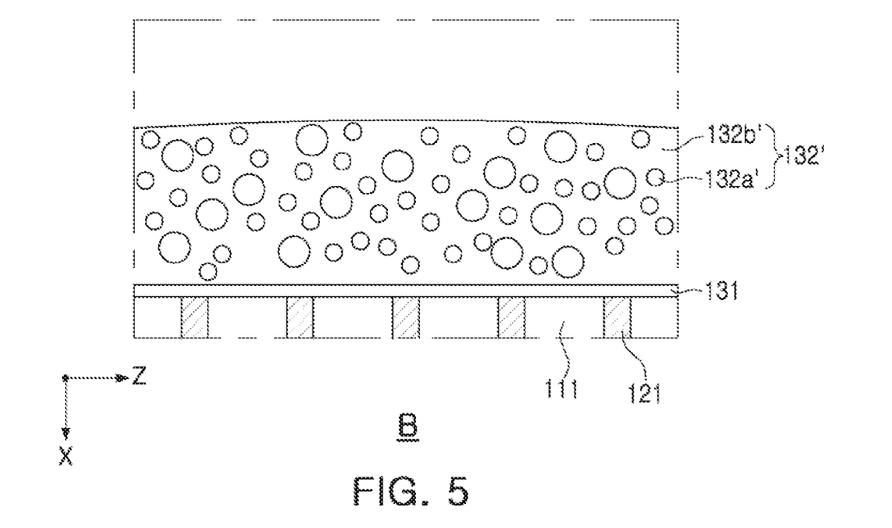
FIG. 5 is a schematic enlarged cross-sectional view of the portion 'B' of an MLCC according to another exemplary embodiment in the present disclosure.
Figure 6:
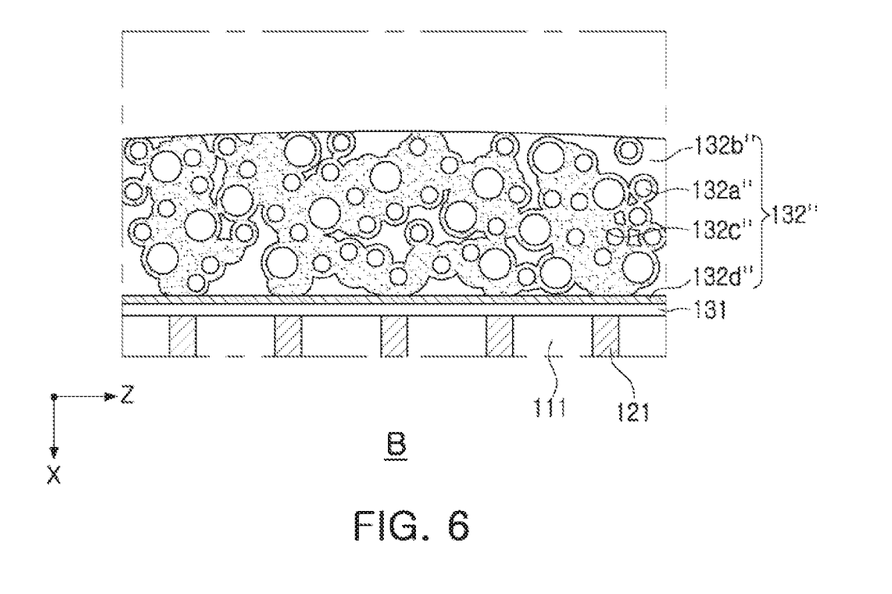
FIG. 6 is a schematic enlarged cross-sectional view of the portion 'B' of an MLCC according to another exemplary embodiment in the present disclosure.

As described above, since sufficient moisture resistance reliability and electrode connectivity are ensured by the first electrode layer, there is no need to limit the second electrode layer but the second electrode may have such a shape as illustrated in FIGS. 4 to 6.

FIG. 4 is a schematic enlarged cross-sectional view of a portion 'B' of FIG. 2.

Referring to FIG. 4, the second electrode layer may be a sintered electrode 132 including a conductive metal 132a and a glass 132b. The glass 132b serves to help form an alloy between the conductive metal 132a and the first electrode layer 131 and acts as a binder to perform sealing.

In this case, for example, the sintered electrode 132 may be formed by applying paste containing the conductive metal 132a and the glass 132b to the first electrode layer and then 20 sintering the applied paste.

Here, the conductive metal 132a may be Cu.

FIG. 5 is a schematic enlarged cross-sectional view of the portion 'B' of an MLCC according to another exemplary embodiment in the present disclosure.

Referring to FIG. 5, the second electrode layer may be a resin-based electrode 132' including a plurality of metal particles 132a' and a base resin 132b'.

The resin-based electrode 132' is in such a form that a plurality of metal particles 132a' are dispersed in the base resin 132 b'. Here, as an example of obtaining a resin-based electrode, paste in which metal particles are dispersed in a base resin may be used. Since the applied paste is formed through drying and curing, the metal particles may not be melted and present in the resin-based electrode in the form of particles, unlike the related art method of forming external electrodes through sintering.

Here, the metal particles 132a' may be at least one of Cu, Ni and Ag.

Meanwhile, the metal particles 132a', as well as having a spherical shape, may also have a flake shape only or a mixture of the spherical shape and the flake shape, as necessary.

The base resin 132b' may include a thermosetting resin.

Here, the thermosetting resin may be, for example, an epoxy resin, but the present disclosure is not limited thereto.

The base resin 132b' serves to mechanically bond the first electrode layer 131 and the plating layer (133).

FIG. 6 is a schematic enlarged cross-sectional view of the portion 'B' of an MLCC according to another exemplary embodiment in the present disclosure.

Referring to FIG. 6, a second electrode layer 132" may be a resin-based electrode 132" including a plurality of metal particles 132a", a conductive connecting portion 132c" surrounding the plurality of metal particles, a base resin 132b", and an intermetallic compound 132d" in contact with the first electrode layer 131 and the conductive connecting portion 132c".

The resin-based electrode 132" containing the intermetallic compound 132d" is in a form that the plurality of metal particles 132a" are dispersed in the base resin 132b".

Here, the metal particles 132a" may be at least one of Cu, Ni, Ag, Ag-coated Cu, and Sn-coated Cu.

Meanwhile, the metal particles 132a", as well as having a spherical shape, may also have a flake shape only or a mixture of the spherical shape and the flake shape, as necessary.

The base resin 132b" may include a thermosetting resin.

Here, the thermosetting resin may be, for example, an epoxy resin, but the present disclosure is not limited thereto.

The base resin 132b" serves to mechanically bond the first electrode layer 131 and the plating layer (133).

The conductive connecting portion 132c" in a molten state may serve to surround the plurality of metal particles 132a" to connect the plurality of metal particles 132a" to each other, thus minimizing stress in the body 110 and improving a high temperature load and moisture resistance load characteristics.

Here, a metal included in the conductive connecting portion 132c" may have a melting point lower than a curing temperature of the base resin 132b".

That is, since the conductive connecting portion 132c" has a melting point lower than the curing temperature of the base resin 132b", the conductive connecting portion 132c" is melted during a drying and curing process, and as illustrated in FIG. 5, the conductive connecting portion 132c" in a molten state may cover the metal particles 132a".

Here, the metal of the conductive connecting portion may be a metal having a low melting point of 300° C. or lower. For example, the metal may contain Sn having melting point of 213 to 220° C.

The intermetallic compound 132d" is disposed to be in contact with the first electrode layer 131 and serves to reduce contact resistance between the resin, electrode 132" and the first electrode layer 131. Also, the intermetallic compound 132d is in contact with the conductive connecting portion 132c" to connect the first electrode layer 131 and the conductive connecting portion 132c".

In this case, as an example of obtaining the resin-based electrode 132", a paste in which metal particles of at least one of Cu, Ni, Ag, Ag-coated Cu, and Sn-coated Cu and a low melting point metal having a melting point lower than the curing temperature of the base resin 132b" are dispersed in the base resin 132b" may be used, and since the applied paste is formed through drying and curing, the metal particles may not be melted but may be present in a particle form in the resin-based electrode, unlike the related art method of forming external electrodes through sintering.

Here, the low melting point metal may be at least one of Sn/Bi, Sn—Pb, Sn—Cu, Sn—Ag, and Sn—Ag—Cu.

The external electrodes 130 and 140 may further include a plating layer (133) formed on the second electrode layers 132 and 142.

Further, the plating layer may have a multilayer structure. For example, a plating layer may have a multilayer structure such as Ni/Sn, Sn/Ni/Sn, Cu/Ni/Sn, and the like.

Method of Manufacturing MLCC

FIGS. 7 through 10 are perspective views schematically illustrating each stage of a method of manufacturing an MLCC as another aspect of the present disclosure.

A method of manufacturing an MLCC according to another aspect of the present disclosure includes: preparing a body including a dielectric layer and internal electrodes; forming a first electrode layer including titanium nitride (TiN) on the entire surface of the body using an atomic layer deposition (ALD) method; forming a second electrode layer on portions of the body where the first electrode layer is formed and on which first and second external electrodes are to be formed; and etching and removing an exposed portion of the first electrode layer from the body where the second electrode layer is not formed.

Figure 7:
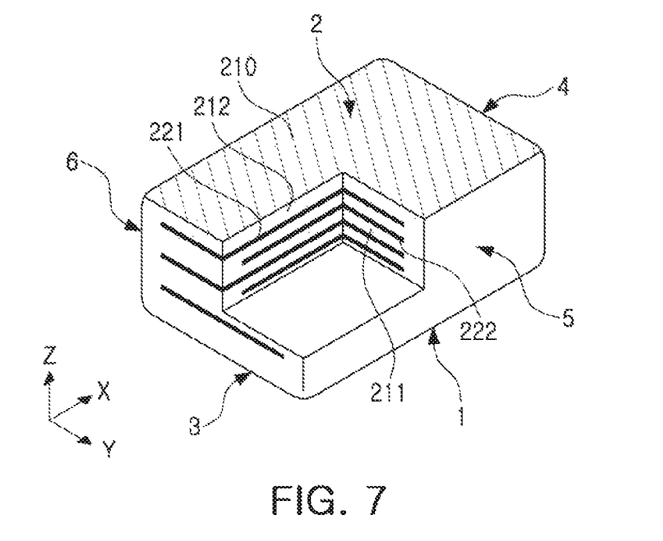
FIGS. 7 through 10 are perspective views schematically illustrating each stage of a method of manufacturing an MLCC as another aspect of the present disclosure.

Referring to FIG. 7, an operation of preparing a body including a dielectric layer 211 and internal electrodes 221 and 222 may be performed.

A slurry containing powder such as barium titanate (BaTiO$_3$) is applied to a carrier film and dried to prepare a plurality of ceramic sheets.

The ceramic sheets may be formed as follows. That is, ceramic powder such as barium titanate (BaTiO$_3$), a binder, a solvent, and the like, are mixed to prepare a slurry and the slurry is treated through a doctor blade method to form a sheet having a thickness of a few microns.

Next, a conductive paste containing conductive metal may be prepared. The conductive metal may be nickel (Ni), copper (Cu), palladium (Pd), silver (Ag), lead (Pb), or platinum (Pt) alone or alloys thereof, and conductive paste for an internal electrode including a conductive metal having an average particle size of 0.1 to 0.2 pm and containing 40 to 50 wt % may be prepared.

The conductive paste for an internal electrode may be applied to the ceramic sheet by a printing method, or the like, to form an internal electrode pattern. Here, the conductive 25 paste may be printed by a screen printing method or a gravure printing method, but the present disclosure is not limited thereto.

The ceramic sheets on which the internal electrode pattern is printed are stacked and ceramic sheets on which the internal electrode pattern is not printed are stacked above and below the ceramic sheets with the printed internal electrode pattern to form a multilayer body including the internal electrodes 221 and 222. Here, the number of stacked ceramic sheets on which the internal electrode pattern is printed may be adjusted according to a desired capacity of the MLCC. The ceramic sheets on which the internal electrode pattern is not printed become cover parts 212 disposed on the upper and lower surfaces of the body 210.

Thereafter, the multilayer body may be compressed and sintered to form the body 210.

Figure 8:
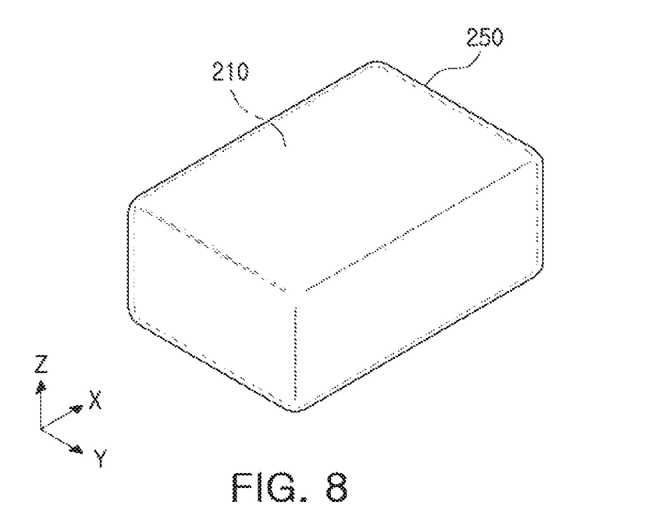

Referring to FIG. 8, a body 210 is formed, and a first electrode layer 250 including TiN is then formed on the entire surface of the body 210 by an ALD method.

Figure 9:
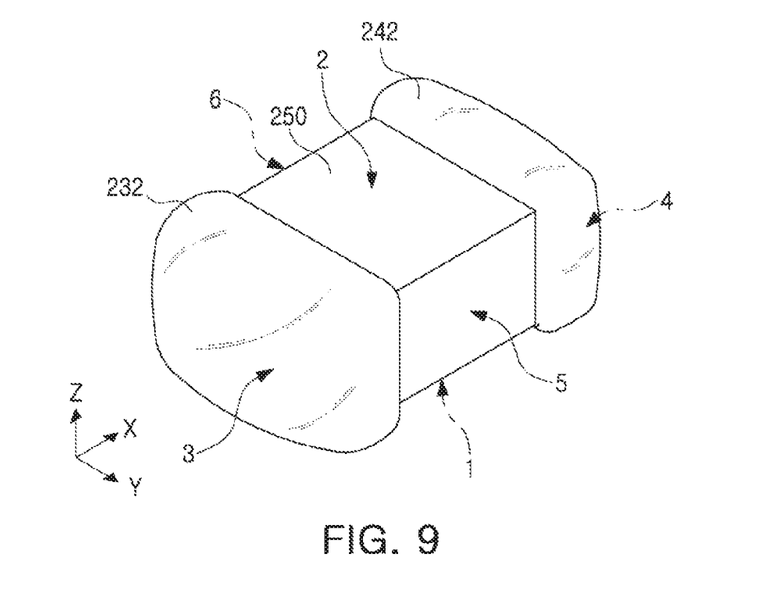

Next, referring to FIG. 9, second electrode layers 232 20 and 242 are formed on portions where first and second external electrodes are to be formed in the body on which the first electrode layer 250 is formed.

For example, the second electrode layers may be formed by applying and sintering paste containing a conductive metal and glass.

Further, after the paste in which metal particles are dispersed in the base resin is applied, the paste may be dried and cured to form the second electrode layers.

Further, paste in which a low melting point metal having a melting point lower than the curing temperature of the metal particles and the base resin is dispersed in the base resin may be applied, dried, and subsequently cured to form the second electrode layers.

Figure 10:
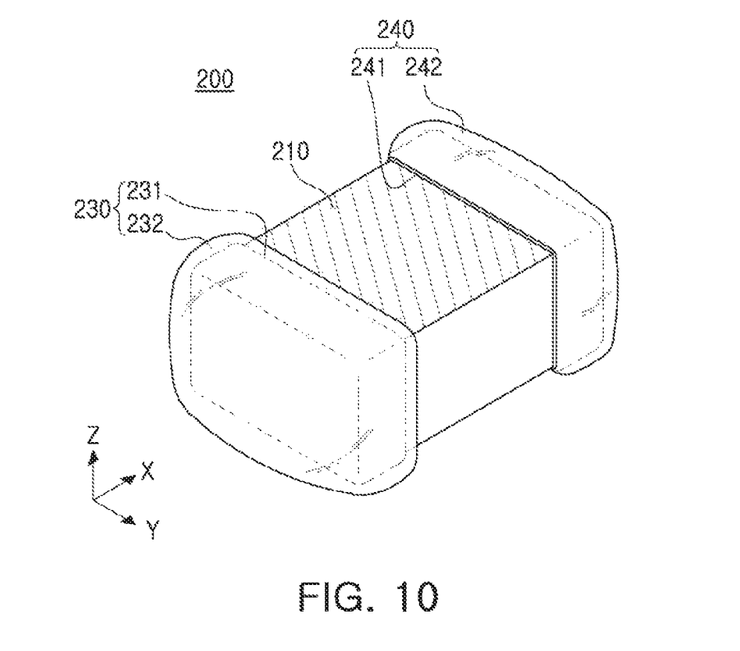
Figure 11:
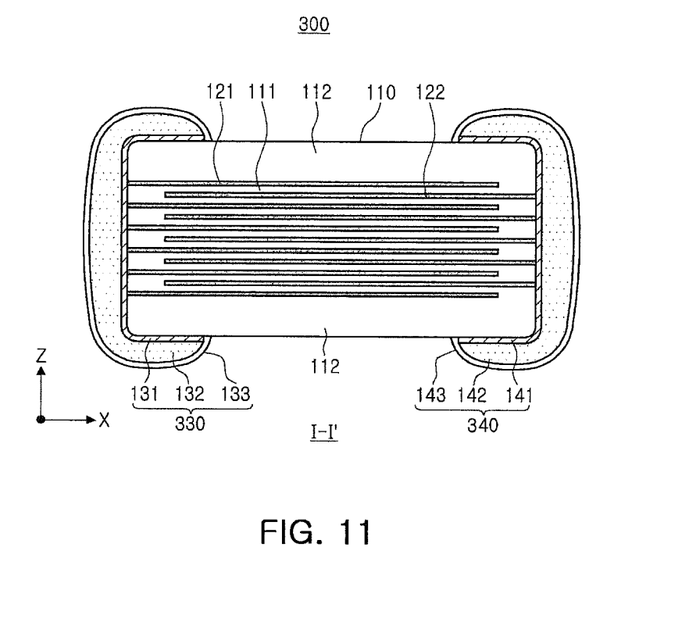
FIG. 11 is a cross-sectional view taken along line I-I' of FIG. 1 according to another exemplary embodiment in the present disclosure.

Referring to FIG. 10, an exposed portion of the first electrode layer 250 is etched and removed from the body having the second electrode layers 232 and 242 to form first and second external electrodes 230 and 240 including first electrode layers 231 and 232 and second electrode layers 232 and 242, thus completing an MLCC.

Since the second electrode layers 232 and 242 act as passivation layers, the exposed portion of the first electrode layer 250 may be etched and removed without having to form a separate protective layer.

In addition, the etching may be dry etching or wet etching.

Thereafter, forming a plating layer on the first and second external electrodes 230 and 240 may be additionally performed as necessary but the present disclosure is not limited thereto.

As set forth above, since the MLCC according to exemplary embodiments of the present disclosure has the thin, dense first electrode layer formed on the body thereof, sufficient moisture resistance reliability may be ensured although the external electrodes are thin, and an effective volume ratio may be enhanced.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a body including a dielectric layer and internal electrodes; and
external electrodes disposed on one surface of the body, wherein
the external electrodes include:
a first electrode layer disposed on one surface of the body, in contact with the internal electrodes, and including titanium nitride (TiN); and
a second electrode layer disposed on the first electrode layer.

2. The multilayer ceramic capacitor of claim 1, wherein the first electrode layer is an atomic layer deposited film.

3. The multilayer ceramic capacitor of claim 1, wherein a thickness of the first electrode layer is in a range from 10 to 500 nm.

4. The multilayer ceramic capacitor of claim 1, wherein the body includes first and second surfaces opposing each other, third and fourth surfaces connected to the first and second surfaces and opposing each other, and fifth and sixth surfaces connected to the first and second surfaces, connected to the third and fourth surfaces, and opposing each other,
the internal electrodes include first and second internal electrodes alternately disposed with the dielectric layer interposed therebetween such that first ends thereof are alternately exposed to the third and fourth surfaces, and
the external electrodes include first and second external electrodes disposed on the third and fourth surfaces of the body and respectively connected to the first and second internal electrodes.

5. The multilayer ceramic capacitor of claim 4, wherein the first and second external electrodes include connecting portions respectively formed on the third and fourth surfaces of the body, band portions extending from the connecting portions so as to be formed on portions of the first, second, fifth, and sixth surfaces of the body, and corner portions where the connecting portions and the band portions are contiguous, and
$t2/t1$ is 0.9 or greater in which $t1$ is a thickness of the connecting portion of the first electrode layer and $t2$ is a thickness of the corner portion of the first electrode layer.

6. The multilayer ceramic capacitor of claim 1, wherein the second electrode layer is a sintered electrode including a conductive metal and glass.

7. The multilayer ceramic capacitor of claim 6, wherein the conductive metal is Cu.

8. The multilayer ceramic capacitor of claim 1, wherein the second electrode layer is a resin-based electrode including metal particles and a base resin.

9. The multilayer ceramic capacitor of claim 8, wherein the metal particles are selected from the group consisting of Cu, Ni, Ag, and a combination thereof.

10. The multilayer ceramic capacitor of claim 1, wherein the second electrode layer includes metal particles, a conductive connecting portion surrounding the metal particles, a base resin, and an intermetallic compound formed on an interface where the first electrode layer and the conductive connecting portion are contiguous.

11. The multilayer ceramic capacitor of claim 10, wherein the metal particles are selected from the group consisting of Cu, Ni, Ag, Ag-coated Cu, and Sn-coated Cu.

12. The multilayer ceramic capacitor of claim 1, wherein the external electrodes further include a plating layer formed on the second electrode layer.

13. A method of manufacturing a multilayer ceramic capacitor, the method comprising:
preparing a body including a dielectric layer and internal electrodes;
forming a first electrode layer including titanium nitride (TiN) on the entire surface of the body using an atomic layer deposition (ALD) method;
forming a second electrode layer on portions of the body on which first and second external electrodes are to be formed such that the second electrode layer is disposed on the first electrode layer; and
removing an exposed portion of the first electrode layer from the body where the second electrode layer is not formed.

14. The method of claim 13, wherein
the second electrode layer is formed by applying paste including a conductive metal and glass and sintering the paste.

15. The method of claim 13, wherein
the second electrode layer is formed by applying paste prepared by dispersing metal particles in a base resin, drying, and subsequently curing the paste.

16. The method of claim 13, wherein
the second electrode layer is formed by applying paste prepared by dispersing metal particles and a low melting metal having a melting point lower than a curing temperature of a base resin in the base resin, drying, and subsequently curing the paste.

17. A multilayer ceramic capacitor comprising:
a body including a dielectric layer and internal electrodes; and
external electrodes comprising a first electrode layer and a second electrode layer sequentially disposed on the body, the first electrode layer comprising titanium nitride and disposed conformally on an external surface of the body such that the first electrode layer is in contact with the internal electrodes.

18. The multilayer ceramic capacitor of claim 17, wherein the external electrodes comprise a first external electrode and a second external electrode disposed to be in contact with corresponding internal electrodes of opposing polarity.

19. The multilayer ceramic capacitor of claim 17, wherein the first electrode layer extends contiguously from a connecting portion to a band portion of the external electrodes, wherein the connecting portion of each of the external electrodes is in contact with corresponding internal electrodes and the band portion of each of the external electrodes is a portion disposed on a surface of the body parallel to the internal electrodes and separated from the internal electrodes by the dielectric layer, wherein
$t2/t1$ is 0.9 or greater in which $t1$ is a thickness of the connecting portion of the first electrode layer and $t2$ is a thickness of the corner portion of the first electrode layer, the corner portion being disposed between the connecting portion and the band portion.

* * * * *